United States Patent
Kawamura et al.

(10) Patent No.: US 10,281,653 B2
(45) Date of Patent: May 7, 2019

(54) OPTICAL RECEIVER MODULE AND PROCESS TO ASSEMBLE OPTICAL RECEIVER MODULE

(71) Applicant: SUMITOMO ELECTRIC INDUSTRIES, LTD., Osaka-shi, Osaka (JP)

(72) Inventors: Masanobu Kawamura, Yokohama (JP); Fumihiro Nakajima, Yokohama (JP); Kazushige Oki, Yokohama (JP); Hiroshi Hara, Yokohama (JP); Yasushi Fujimura, Yokohama (JP); Kazunori Tanaka, Yokohama (JP); Michio Suzuki, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 609 days.

(21) Appl. No.: 14/909,710

(22) PCT Filed: Jun. 9, 2015

(86) PCT No.: PCT/JP2015/002887
§ 371 (c)(1),
(2) Date: Feb. 2, 2016

(87) PCT Pub. No.: WO2015/190089
PCT Pub. Date: Dec. 17, 2015

(65) Prior Publication Data
US 2016/0170145 A1 Jun. 16, 2016

(30) Foreign Application Priority Data

Jun. 10, 2014 (JP) .................................. 2014-119605
Mar. 16, 2015 (JP) .................................. 2015-051590

(51) Int. Cl.
*G02B 6/293* (2006.01)
*G02B 6/42* (2006.01)
*G02B 6/32* (2006.01)

(52) U.S. Cl.
CPC .............. *G02B 6/2938* (2013.01); *G02B 6/32* (2013.01); *G02B 6/4214* (2013.01);
(Continued)

(58) Field of Classification Search
CPC ...... G02B 6/2938; G02B 6/32; G02B 6/4225; G02B 6/4227; G02B 6/4249;
(Continued)

(56) References Cited

U.S. PATENT DOCUMENTS 5,883,988 A * 3/1999 Yamamoto ............... G02B 6/42
250/227.15
5,938,211 A 8/1999 Freund et al.
(Continued)

FOREIGN PATENT DOCUMENTS

CN 101266325 A 9/2008
CN 101356699 A 1/2009
(Continued)

OTHER PUBLICATIONS

Search Report in the corresponding International Patent Application No. PCT/JP2015/002887 dated Oct. 27, 2015.
(Continued)

*Primary Examiner* — Georgia Y Epps
*Assistant Examiner* — Don J Williams
(74) *Attorney, Agent, or Firm* — Global IP Counselors, LLP

(57) ABSTRACT

An optical receiver module that receives a wavelength multiplexed light and a process to assemble the optical receiver module are disclosed. The optical receiver module provides a coupling unit to collimate the wavelength mul-
(Continued)

tiplexed light and a device unit that installs an optical de-multiplexer and photodiode elements within a housing. The front wall of the housing through which the wavelength multiplexed light passes is polished in a right angle with respect to the bottom of the housing.

11 Claims, 20 Drawing Sheets

(52) U.S. Cl.
CPC ......... *G02B 6/4225* (2013.01); *G02B 6/4227* (2013.01); *G02B 6/4249* (2013.01); *G02B 6/4257* (2013.01); *G02B 6/4261* (2013.01); *G02B 6/4265* (2013.01); *G02B 6/4295* (2013.01)

(58) Field of Classification Search
CPC .. G02B 6/4257; G02B 6/4261; G02B 6/4265; G02B 6/4295
See application file for complete search history.

(56) References Cited

U.S. PATENT DOCUMENTS

| | | | |
|---|---|---|---|
| 8,380,075 B2 | 2/2013 | Sakigawa et al. | |
| 2004/0101247 A1 | 5/2004 | Chen et al. | |
| 2004/0136640 A1* | 7/2004 | Shahar | G02B 6/125 385/15 |
| 2010/0209103 A1 | 8/2010 | Sakigawa et al. | |
| 2011/0235980 A1 | 9/2011 | Sato | |
| 2011/0243502 A1* | 10/2011 | Matsuura | G02B 6/29367 385/36 |
| 2013/0148970 A1 | 6/2013 | Nakajima et al. | |
| 2015/0309272 A1 | 10/2015 | Cobb et al. | |
| 2015/0365175 A1 | 12/2015 | Kawamura et al. | |
| 2015/0365176 A1 | 12/2015 | Kawamura et al. | |

FOREIGN PATENT DOCUMENTS

| | | |
|---|---|---|
| CN | 103163605 A | 6/2013 |
| JP | H09-073027 A | 3/1997 |
| JP | H09-292542 A | 11/1997 |
| JP | 2000-258654 A | 9/2000 |
| JP | 2003-163341 A | 6/2003 |
| JP | 2007-141317 A | 6/2007 |
| JP | 2008-197459 A | 8/2008 |
| JP | 2011-191647 A | 9/2011 |
| JP | 2011-203458 A | 10/2011 |
| JP | 2011-209367 A | 10/2011 |
| JP | 2013125045 A | 6/2013 |
| JP | 2013-171161 A | 9/2013 |
| JP | 2013183074 A | 9/2013 |
| WO | 2013125728 A1 | 8/2013 |
| WO | 2013128728 A1 | 9/2013 |

OTHER PUBLICATIONS

Final Office Action of the related U.S. Appl. No. 14/735,926, dated Jan. 25, 2017.
Office Action in the corresponding Chinese Patent Application No. 201580001543.8 dated Aug. 19, 2016.
U.S. Appl. No. 14/735,926, filed Jun. 10, 2015.
U.S. Appl. No. 14/790,870, filed Jul. 2, 2015.
U.S. Appl. No. 14/909,710, filed Feb. 2, 2016 (The Present Application).
Non Final Office Action of the related U.S. Appl. No. 14/735,926, dated May 24, 2016.
Non Final Office Action of the related U.S. Appl. No. 14/735,926, dated Oct. 4, 2017.
Non Final Office Action of the related U.S. Appl. No. 14/790,870, dated Oct. 12, 2017.

* cited by examiner

OPTICAL RECEIVER MODULE AND PROCESS TO ASSEMBLE OPTICAL RECEIVER MODULE

CROSS-REFERENCE TO RELATED APPLICATIONS

This U.S. National stage application claims priority under 35 U.S.C. § 119(a) to Japanese Patent Application No. 2014-119605, filed in Japan on Jun. 10, 2014 and to Japanese Patent Application No. 2015-051590, filed in Japan on Mar. 16, 2015, the entire contents of both Japanese Patent Application No. 2014-119605 and Japanese Patent Application No. 2015-051590 are hereby incorporated herein by reference in their entirety.

TECHNICAL FIELD

The present application relates to an optical receiver module and a process to assemble the optical receiver module.

BACKGROUND ART

An optical receiver module to receive a wavelength multiplexed light often installs a plurality of photodiodes (PDs) within a unique housing with an optical de-multiplexer to de-multiplex the wavelength multiplexed light into a plurality of optical signals each having a specific wavelength different from others. One type of the optical de-multiplexer has a plurality of wavelength selective filters (WSFs) and a plurality of reflectors sequentially disposed along the optical path thereof. The WSFs each transmits an optical signal with a wavelength specific thereto and reflects other optical signals.

For such an optical de-multiplexer, an incident angle of the wavelength multiplexed light becomes a key factor to output de-multiplexed optical signals uniformly, because optical paths from the input port of the optical de-multiplexer to respective WSFs are not uniform, and a WSF is influenced by the incident angle of the wavelength multiplexed light as it is apart from the input port on the optical path. One reason to cause a deviation in the incident angle of the wavelength multiplexed light into the optical de-multiplexer is how to fix the coupling unit to the front wall of the housing of the module. The front wall of the housing often provides a bush with an opening, through which the wavelength multiplexed light passes, to make the fixation of the coupling unit by the laser welding. Such a two-body structure of the bush and the housing becomes hard to set the angle of the front wall, namely, the surface of the bush, within an acceptable range of ±0.5° around the designed angle.

As the transmission speed of the optical signal increases, a pre-amplifier that converts a photocurrent generated by a PD into a voltage signal becomes necessary to be mounted immediate to the PD. Moreover, when an optical module like the present application receives a wavelength multiplexed signal, a plurality of pre-amplifiers is necessary to be installed immediate to the PDs within the housing. These two reasons of the increase of the transmission speed and the installation of the plural pre-amplifiers cause greater power consumption by the pre-amplifiers, which means that the pre-amplifiers are preferably placed immediate to the PDs on the bottom of the housing to enhance the efficiency of the heat dissipation; accordingly, the PDs are also mounted on the bottom so as to face the sensing surface thereof upward. A specific arrangement of the optical de-multiplexer is necessary to guide the optical signals de-multiplexed thereby to the PDs on the bottom of the housing.

SUMMARY OF INVENTION

One aspect of the present application relates to an optical receiver module that comprises a coupling unit and a device unit. The coupling unit collimates a received wavelength multiplexed signal. The device unit, which includes an optical de-multiplexer, a plurality of PD elements, and a housing that enclosing the optical de-multiplexer and the PD elements therein. The optical de-multiplexer de-multiplexes the wavelength multiplexed signal into a plurality of optical signals each having a wavelength different from others. The housing provides a bottom and a side wall having a window through which the wavelength multiplexed signal passes. The optical de-multiplexer is set in parallel to the bottom of the housing, and the coupling unit is fixed to the side wall. A feature of the optical receiver module of the present application is that the side wall of the housing is polished in a right angle with respect to the bottom of the housing.

Another aspect of the present application relates to a process to assemble the optical receiver module. The optical receiver module provides a coupling unit and a device unit. The coupling unit collimates a wavelength multiplexed signal received by the optical receiver module. The device unit includes an optical de-multiplexer, a mirror, a PD array, and a housing. The optical de-multiplexer generates a plurality of optical signals each having a specific wavelength different from other by de-multiplexing the wavelength multiplexed signal provided from the coupling unit. The mirror reflects the optical signals toward the PD array. The PD array integrates a plurality of PD elements for detecting respective optical signals reflected by the mirror. The housing, which encloses the optical de-multiplexer, the mirror, and the PD array therein, has a side wall and a bottom making an angle of 90±0.5° with respect to the side wall. The side wall fixes the coupling unit thereto. The process of the present invention comprising steps of: (a) mounting the optical de-multiplexer and the mirror on a carrier such that the optical de-multiplexer makes a preset angle with respect to an edge of the carrier; (b) installing the carrier within the housing by steps of abutting the edge of the carrier against the side wall of the housing, and translating the carrier within the housing; and (c) s aligning the optical de-multiplexer with the PD array.

BRIEF DESCRIPTION OF DRAWINGS

The foregoing and other purposes, aspects and advantages will be better understood from the following detailed description of a preferred embodiment of the invention with reference to the drawings.

DESCRIPTION OF EMBODIMENTS

Next, some embodiments according to the present application will be described in detail as referring to drawings. However, it is evident that various modifications and changes may be made to those embodiments without departing from the broader spirit and scope of the present invention. The present specification and figures are accordingly to be regarded as illustrative rather than restrictive. Also, in the description of the drawings, numerals or symbols same with or similar to each other will refer to elements same with or similar to each other without duplicated explanations.

Figure 1:
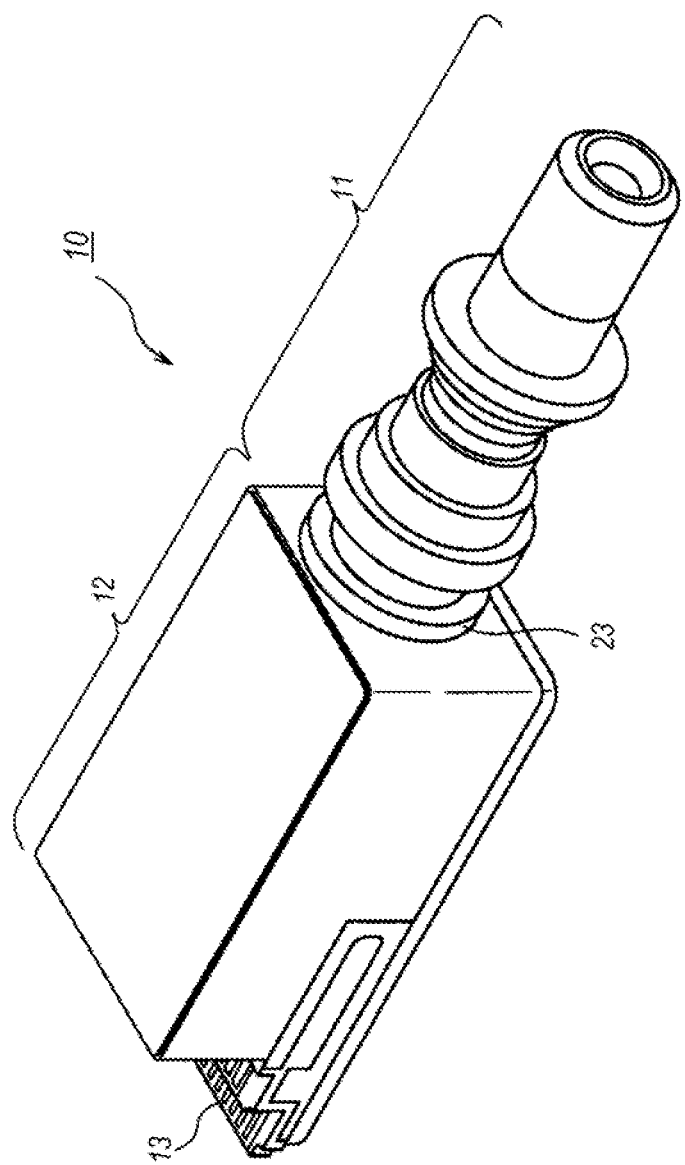
FIG. 1 is a perspective view of an optical receiver module assembled by a process according to the present invention.
Figure 2:
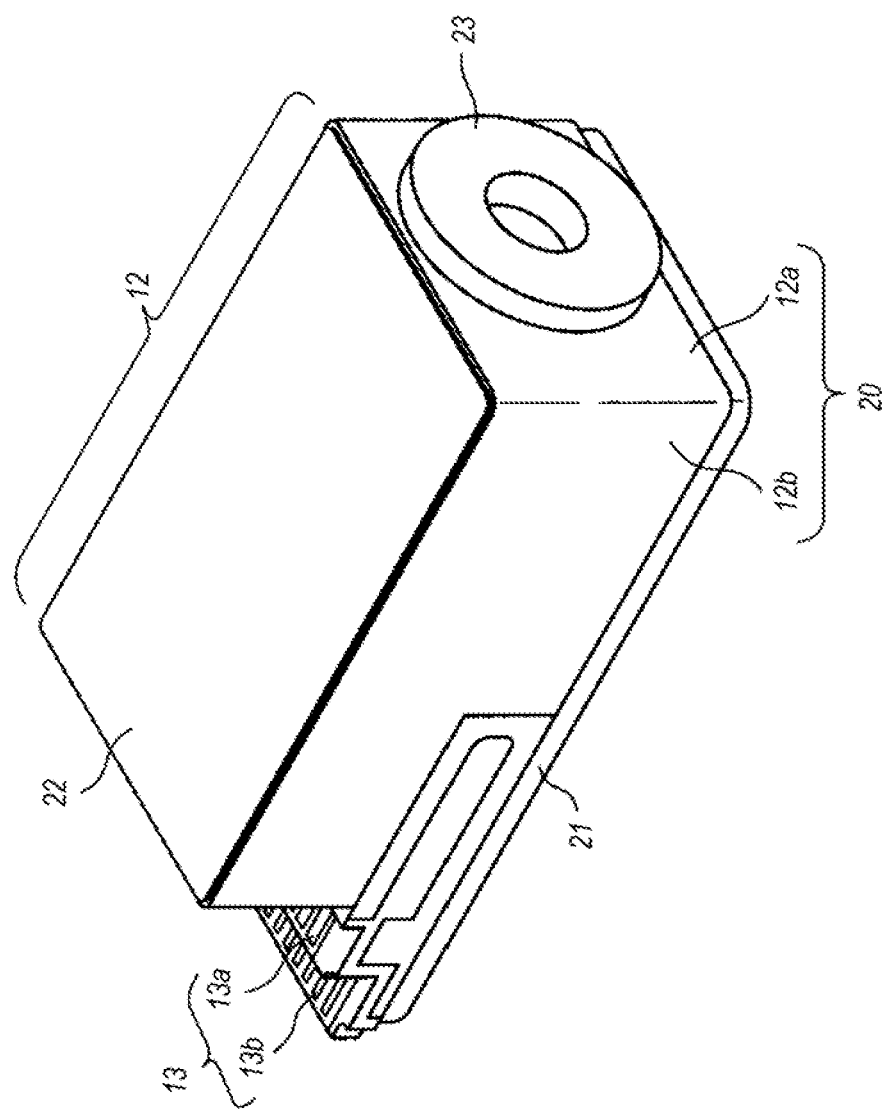
FIG. 2 is a perspective view of a device unit of the optical receiver module shown in FIG. 1.
Figure 3:
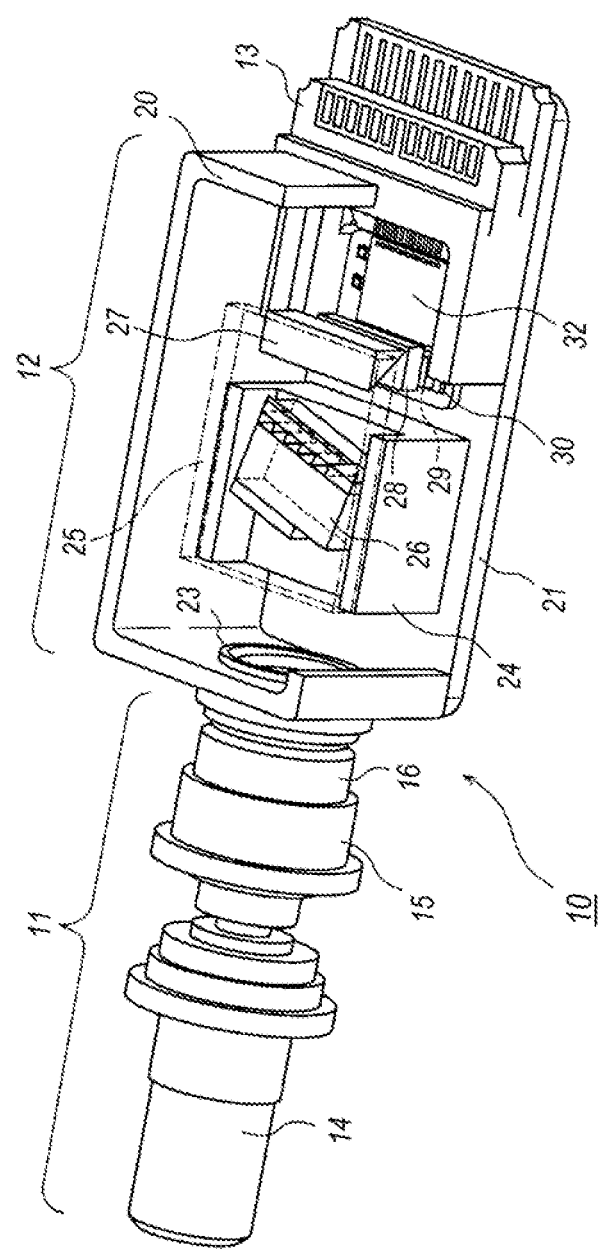
FIG. 3 shows an inside of the device unit of the optical receiver module shown in FIG. 1.
Figure 4A:
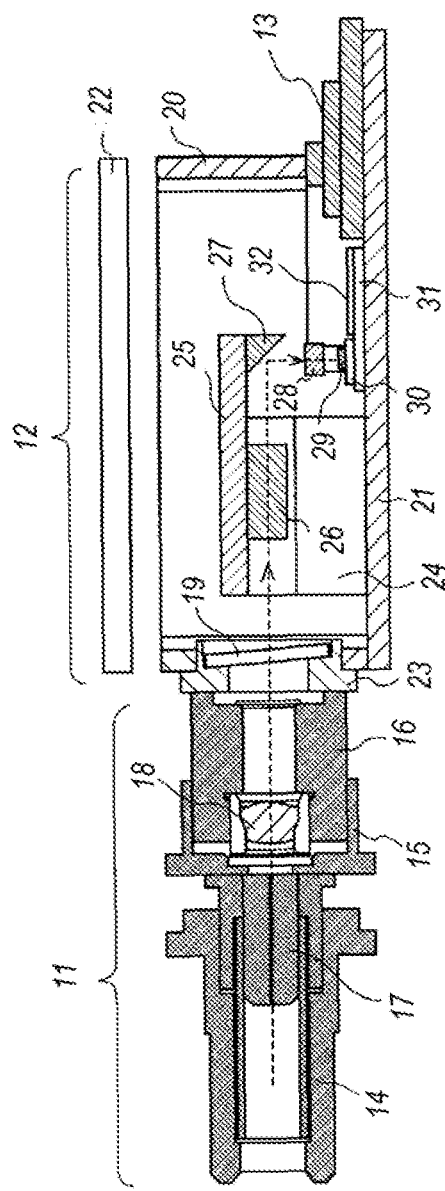
FIG. 4A is a longitudinal cross section showing an arrangement of the optical coupling between the coupling unit and semiconductor devices mounted on the bottom of the housing through an optical de-multiplexer.
Figure 4B:
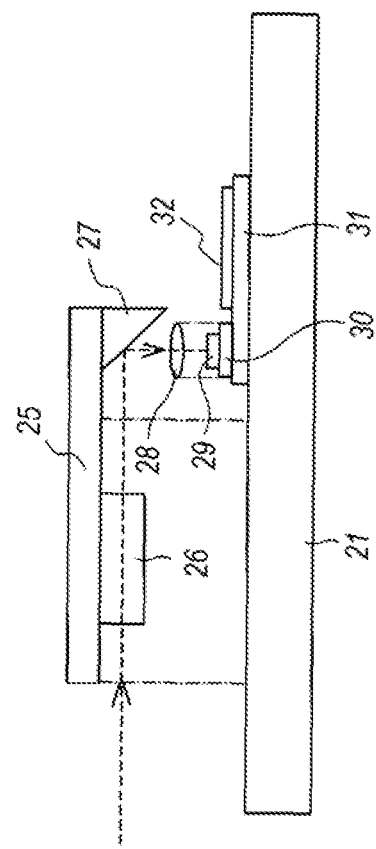
FIG. 4B magnifies the optical coupling system in the device unit.

First, as referring to FIGS. 1 to 6, an example of an optical receiver module 10 assembled by a process of the present invention will be described. FIG. 1 is a perspective view of the optical receiver module 10, and FIG. 2 is also a perspective view but only showing a device unit 12 of the optical receiver module 10 as removing the coupling unit 11. FIG. 3 shows an inside of the device unit 10 by removing a lid thereof, and FIGS. 4A and 4B are cross sections taken along the longitudinal direction of the receiver module, which is along the optical axis thereof.

The optical receiver module 10 comprises the coupling unit 11 and the device unit 12. The device unit 12 encloses semiconductor optical devices, optical components, electrical devices, and so on, while, the coupling unit 11 optically couples an external optical fiber set therein with optical devices in the device unit 12. The device unit 12 provides a terminal 13 in the rear end thereof. The description below assumes that a direction "forward" or "front" corresponds to the direction where the coupling unit 11 is provided and the direction "rear" is opposite, namely, the side where the device unit 12 is provided. However, these notations are only for the explanation sake and do not restrict the scope of the invention at all.

The terminal 13 electrically connects electrical components enclosed within the device unit 12 to external systems, and includes pads for radio frequency (RF) signals, power supplying lines, and a ground. As shown in FIG. 2, the terminal 13 includes a first group of pads 13a arranged in the upper substrate and a second group of pads 13b in the lower substrate. The terminal 13 may be made of multi-layered ceramics that pass through a rear wall opposite to the front wall 12a. The first group of the pads 13a is for supplying an electrical power to pre-amplifiers and biases to photodiodes (PDs) each enclosed within the device unit 12. The second group of the pads 13b is for RF signals output from the pre-amplifiers. In the present embodiment, the second group of pads 13b is arranged in G/Sig/G/NSig/G, where "G", "Sig", and "NSig" mean the ground, the positive phase signal, and the negating phase signal, respectively, for each signal channels. The ground pads in respective ends are common to the next channels.

The optical receiver module 10 of the present embodiment provides the pads only in the rear wall of the device unit 12, namely, the side walls 12b of the device unit 12 are free from the pads. This is because of the standard of optical transceiver into which the optical receiver module 10 is installed. Specifically, most standards define the outer dimensions of the optical transceivers. An optical transceiver having optional outer dimensions is unable to set within a cage prepared on the host system; or able to be set thereon but with a large gap against the cage of the host system to cause the EMI leakage through the gap. Accordingly, the standard strictly defines the outer dimensions of the optical transceiver including the width thereof. When an optical receiver module is installed with an optical transmitter module in side by side arrangement, no room, or almost no room is left in the sides of the optical receiver module 10. Accordingly, the optical receiver module 10 of the present application has no terminals.

The coupling unit 11 receives an optical ferrule attached in an end of an external optical fiber, and generates a collimated light. In the present embodiment, the optical fiber transmits light that multiplexes a plurality of optical signals each having a specific wavelength different from others. The coupling unit 11 includes from the rear side thereof close to the device unit 12, as shown in FIG. 4A, a lens holder 16, a joint sleeve 15, and a sleeve 14. The sleeve 14 provides a stub 17 in an end close to the device unit 12, and receives the external ferrule in another end. Abutting the end of the external ferrule against the end of the stub 17, the physical contact (PC) may be realized within the sleeve 14 between the external fiber and a coupling fiber secured in the center of the stub 17. The lens holder 16 provides the collimating lens 18 therein. This collimating lens 18 collimates the dispersive light output from the end of the coupling fiber. The joint sleeve 15 optically aligns the stub 17 and the sleeve 14, namely, the external fiber, with the collimating lens 18, namely, the optical components in the device unit 12. Specifically, the Z-alignment along the optical axis may be carried out by adjusting an overlapping length of the joint sleeve 15 with the lens holder 16, and the XY-alignment perpendicular to the optical axis may be performed by sliding the stub 17 and the sleeve 14 on the end surface of the joint sleeve 15. Thus, the light diffusively output from the end of the coupling fiber may be converted into a collimated beam by the collimating lens 18. The light thus converted into the collimated beam enters the device unit 12 through the window 19.

The device unit 12, which has a box shaped housing, provides a frame 20, a bottom 21 made of copper tungsten (CuW) and/or copper molybdenum (CuMo) having effective thermal conductivity, and a lid 22 to shield a space surrounded by the frame 20 and the bottom 21 air-tightly. The frame 20 includes the front wall 12a, two side walls 12b, and the rear wall.

The front wall 12a provides the bush 23 that holds the window 19. As described later, the front surface 23a of the bush 23 is formed so as to make a right angle with respect to the bottom 21. Specifically, the front surface 23a of the bush 23 is formed in flat and polished with respect to the optical axis of the coupling unit 11 and that of the optical components installed within the device unit 12. The coupling unit 11 is fixed to this polished surface 23a of the bush 23. The polished surface 23a of the bush 23 makes a right angle against the bottom 21 and respective side walls 12b by accuracy within ±0.5°.

The device unit 12 installs an optical de-multiplexer (O-DeMux) 26, a mirror 27, a lens array 28, and a photo-diode (PD) array 29 therein. The O-DeMux 26 may de-multiplex the signal light into respective optical signals each having wavelengths specific thereto and different from others. Details of the O-DeMux 26 will be described later.

The mirror 27 reflects optical signals thus de-multiplexed by the optical de-multiplexer 26 toward the bottom 21 of the device unit 12, that is, the mirror 27 bends the optical axes of respective optical signals by substantially 90°. The mirror 27 may have a type of the prism mirror having a hypotenuse as a reflecting surface. The O-DeMux 26 and the mirror 27 are mounted on a carrier 25, and the carrier 25 is mounted on a support 24 such that the O-DeMux 26 and the mirror 2 faces the bottom 21 of the device unit 12, and the carrier 25 is in parallel to the bottom 21. That is, the carrier 25 that mounts the O-DeMux 26 and the mirror 27 thereon is set on the support 24 as turning the carrier 25 upside down.

As described, the optical receiver module 10 of the embodiment installs the O-DeMux 26 and the mirror 27 on the carrier 25 in a surface facing the bottom 21 and extending in parallel thereto. Moreover, the lens array 28 and the PD array 29 are vertically arranged within a space under the carrier 25, which enhances the space factor in the device unit 12 and generates a room where the pre-amplifier IC 32 is installed immediate to the PD array 29 to amplify faint signals generated in respective PD elements 29a.

Figure 5:
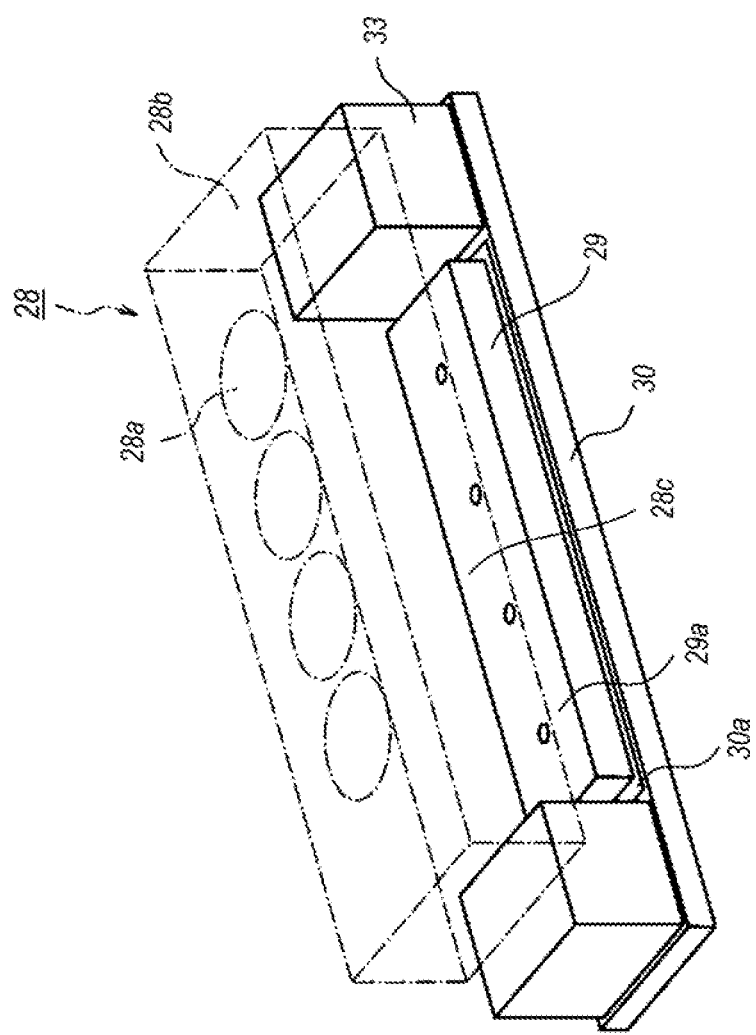
FIG. 5 is a perspective view of the PD assembly that includes the PD array mounted on the first substrate and the lens array mounted above the PD array though the posts.

FIG. 5 explains the arrangement of the lens array 28 and the PD array 29 on the first substrate 30. The lens array 28, as shown in FIG. 5, includes a plurality of lens elements 28a on the substrate 28b, which is transparent for the wavelengths of respective optical signals. Also, the PD array 29 includes a plurality of PD elements 29a. The lens elements 28a have a pitch to the next lens element equal to a pitch of the PD elements 29a. That is, the optical axes of respective lens elements 28a are aligned with the optical axes of respective PD elements 29a.

The first substrate 30 mounts the PD array 29 on a center thereof by an eutectic solder 30a, preferably, gold-tin (AuSn). The first substrate 30 also provides eutectic solders made of AuSn in respective sides thereof to mount posts 33 having a shape of a square pillar and plated with gold (Au). The lens array 28 is assembled on the post 33.

Figure 6:
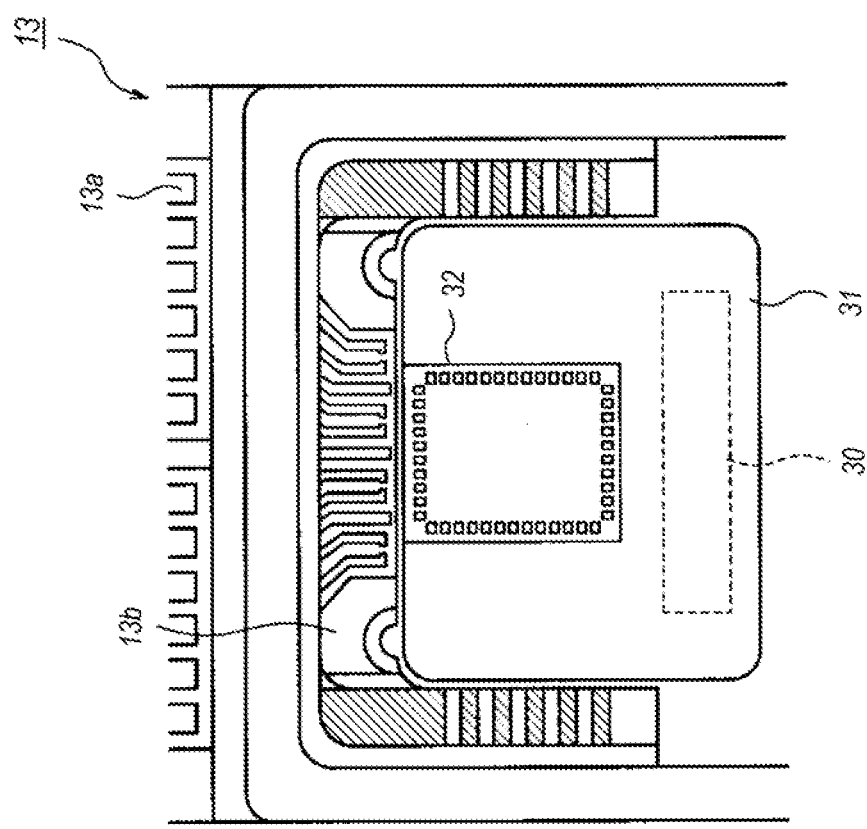
FIG. 6 is a plan view of a rear portion of the housing, where the PD assembly shown in FIG. 5 is not mounted yet.

FIG. 6 is a plan view of the second substrate 31 before assembling the first substrate 30 thereon. The second substrate 31 may be made of copper tungsten (CuW) and placed in a rear portion of the device unit 12, specifically, immediate to the terminal 13 on which interconnections for the RF signals and power supply lines extending from respective pads 13a are provided. Also, the second substrate 31 mounts die-capacitors in outer sides of the pre-amplifier IC 32, which are not shown in FIG. 6, and the first substrate 30 in a front of and immediate to the pre-amplifier IC 32.

Figure 7A:
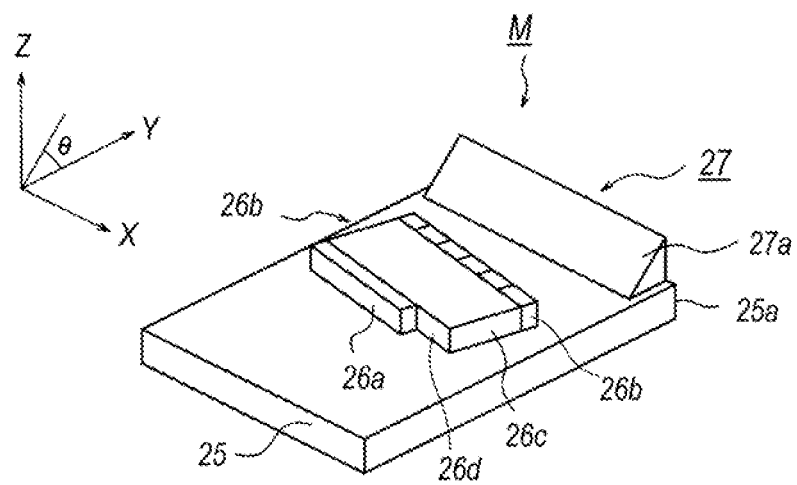
FIG. 7A shows the optical de-multiplexer and the mirror each mounted on the carrier.
Figure 7B:
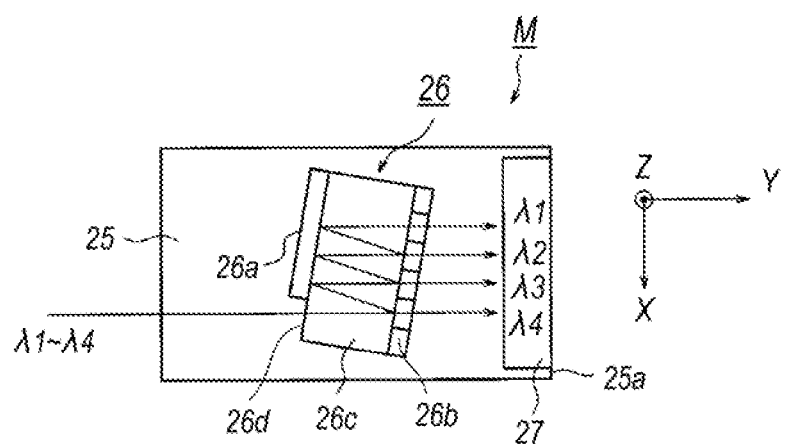
FIG. 7B is a plan view explaining a function of the optical de-multiplexing.

FIGS. 7A and 7B explain the function of the O-DeMux 26 and the mirror 27, where FIG. 7A is a perspective view of an intermediate assembly M that mounts the O-DeMux 26 and the mirror 27 on the carrier 25, and FIG. 7B is a plan view thereof.

The O-DeMux 26, as illustrated in FIG. 7A, integrates a reflector 26a and wavelength selective filters (WDFs) 26b, which are made of multi-layered ceramics and each has a specific transmitting band different from others, on a transparent body 26c. The O-DeMux 26 thus configured is placed in a center of the carrier 25 as setting the input port 26d thereof with a preset angle against the rear edge 25a of the carrier 25. The mirror 27 reflects the optical signals de-multiplexed by the O-DeMux 26 toward the PD array 29. The reflector 27 may be a prism mirror with a reflecting surface 27a making an angle of 45° with respect to the O-DeMux 26 and the PD array 29. The reflector 27 is mounted along the rear edge 25a in the rear end of the carrier 25.

FIG. 7B schematically illustrates a function of the O-DeMux 26. When the signal light, which multiplexes optical signals having wavelengths of $\lambda 1$ to $\lambda 4$ and is converted into the collimated beam by the coupling unit 11, is provided from the coupling unit 11 into the O-DeMux 26, the O-DeMux 26 de-multiplexes the signal light into four optical signals and outputs those optical signals from the WSFs 26b, which are physically isolated to each other, toward the reflector 27 as keeping the parallelism between the optical signals. That is, each of the optical signals are output from the WDFs 26b specific to respective wavelengths after being reflected several times in the O-DeMux 26. Thus, the O-DeMux 26 discriminates optical lengths from the input port, at which the signal light enters, to respective output ports corresponding to the optical signals.

Comparing the optical path within the O-DeMux 26 for the optical signal attributed to the wavelength of $\lambda 1$ with another optical signal having the wavelength of $\lambda 4$, the optical path for the optical signal of $\lambda 4$ becomes seven (7) times longer than that for the former signal of $\lambda 1$. Accordingly, when the signal light enters the O-DeMux 26 as making a substantial angle of elevation or depression, the elevated angle or the depressed angle causes deviation of the optical signals at the WSFs 26b in different manners. For instance, a status possibly occurs where the optical signal of the wavelength $\lambda 1$ is adequately output but the optical signal of the wavelength $\lambda 4$ is unable to be output from the WSF 26b. Accordingly, the elevated angle or the depressed angle of the signal light entering the O-DeMux 26 is necessary to be aligned within ±0.5°, preferably ±0.2°. In the preset optical receiver module, the surface 23a of the bush 23, to which the coupling unit 11 is fixed and becomes the reference plane to install optical components including the O-DeMux 26 in the device unit 12, is preferably and precisely polished so as to make a right angle with respect to the bottom 21 of the device unit 12.

Next, a method to assemble the optical components within the frame 20 will be described. FIGS. 8A to 12 show processes to assemble the optical receiver module 10 according to the present invention. In the explanation below, an assembly including the O-DeMux 26 and the mirror 27 mounted on the carrier 25 is called as an intermediate product.

(1) Assembling Intermediate Product

The intermediate product may be assembled by the processes below. First, the process sets the rectangular carrier 25 on an assembling stage, which is not illustrated in the figures. The stage provides a reference wall, against which the rear edge 25a in the side of the mirror 27 of the carrier 25 is to be abutted, and a flat surface that makes a right angle against the reference wall. Abutting the rear edge 25a of the carrier 25 against the reference wall to make the rear edge 25a parallel to the reference wall, the carrier 25 is placed on the flat surface, of the stage. After placing the carrier 25 on the stage, ultraviolet curable resin are applied to areas where the O-DeMux 26 and the reflector 27 are to be mounted.

Picking the O-DeMux 26 by vacuum collet, abutting a surface of the O-DeMux 26 in the side of the reflector 26a against the reference wall, and rotating the picked O-DeMux 26 by a designed angle, the O-DeMux 26 is placed on a preset position of the carrier 25. Also, picking the mirror 27 and abutting one edge of the mirror 27 against the reference wall, the mirror 27 is placed along the rear edge 25a of the carrier 25.

The present process aligns the O-DeMux 26 and the mirror 27 in the horizontal position thereof according to alignment marks prepared on the surface of the carrier 25, and in the rotational angle and elevated/depressed angle thereof by abutting the respective reference surfaces or wall against the reference wall of the assembling stage. The preciseness of the positions of the O-DeMux 26 and the mirror 27 are possibly affected by the positions of the alignment marks, the levelness of the alignment stage, the perpendicularity of the collet, the reliability of the vacuum absorption of the collet, and so on. However, how the angle between the reference wall and the flat surface of the alignment stage, namely, the angle between the reference surface 23a of the bush 23 and the bottom 21 of the device unit 12 deviates from a right angle becomes a dominant reason of the miss-alignment between the O-DeMux 26 and the lens arrange 28. After placing the O-DeMux 26 and the mirror 27 on the carrier, ultraviolet rays may cure the resin to fix them on the carrier 25, which forms the intermediate product.

(2) Assembling PD Array

Eutectic solder 30a is applied on a center of the first substrate 30, and the PD array is die-bonded on thus applied eutectic solder 30a, as shown in FIG. 5. The PD elements 29a is arrayed corresponding to respective optical signals coming from the lens array 28. Then, the posts 33 are fixed in respective sides of the PD array 29 on the first substrate 30. The post 33 in a surface facing and fixed to the first substrate provides plated metals, while, the first substrate 30 in respective sides on the top surface thereof also provides eutectic solders. Thermal processing of the eutectic solder on the first substrate 30 and the coated metal of the post 33 may fix the post 33 on the first substrate 30. Thus, a PD assembly including the PD array 29, the lens array 28, and the first substrate 30 may be obtained as a PD assembly.

(3) Assembling Second Substrate

Figure 8A:
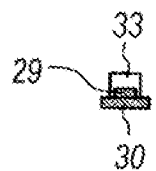
FIG. 8A shows a process to prepare the PD assembly.
Figure 8B:
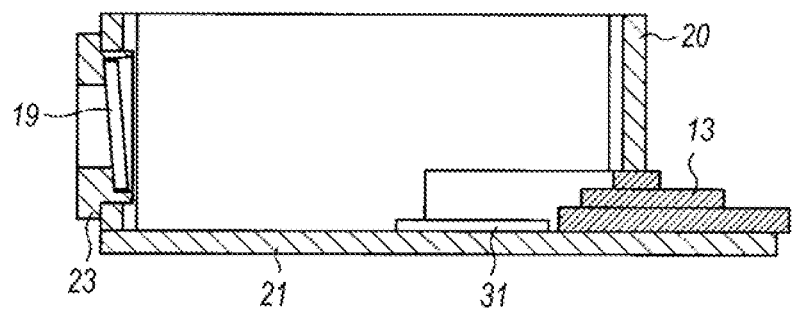
FIG. 8B shows a process to mount the second substrate on the bottom of the housing.
Figure 8C:
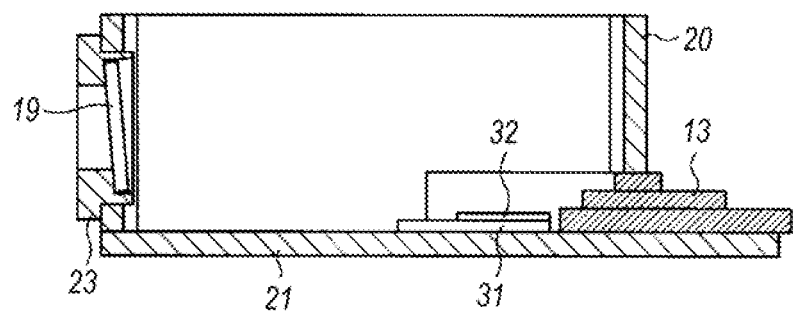
FIG. 8C shows a process to mount the pre-amplifier IC on the second substrate.

Next, as shown in FIG. 8B, the process installs the second substrate 31 at a position on the bottom 21. Specifically, the second substrate 31, which is made of aluminum nitride (AlN), is placed on a position adjacent to the terminal 13 as roughly aligning a longitudinal center thereof with the longitudinal center of the frame 20.

(4) Mounting Components on Second Substrate

The second substrate 31 provides an alignment mark on the top surface thereof, where the alignment mark traces the outer dimensions of the pre-amplifier IC 32. Applying adhesive of epoxy resin containing electrically conductive filler, such as silver (Ag) filler, on a position indicated by the alignment mark, the pre-amplifier IC 32 is placed on thus applied epoxy resin. Thermo-curing the resin, the pre-amplifier IC 32 may be mounted on the second substrate 31. Other electrical components, such as die-capacitors, chip-inductors, chip-resistors, and so on, are mounted on respective positions by procedures similar to those for mounting the pre-amplifier IC 32 described above.

(5) Assembling PD Array

Figure 9A:
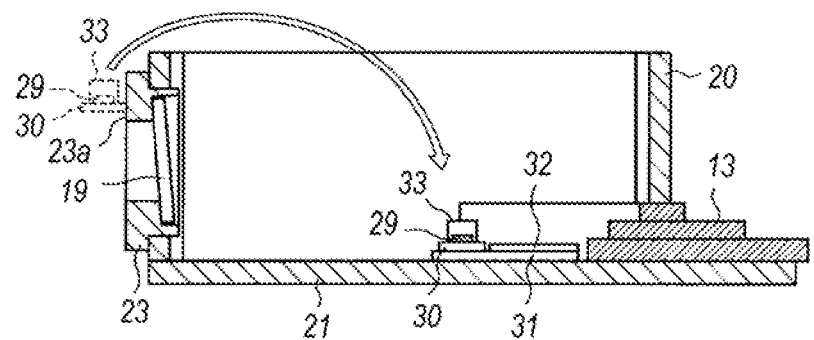
FIG. 9A shows a process to install the PD assembly within the housing.

Then, as shown in FIG. 9A, the PD assembly, which includes the PD array 29 and the post 33 each mounted on the first substrate 31 in the aforementioned process (2), is mounted on the second substrate 31. Specifically, electrically conductive resin is first applied on a position of the second substrate 31 to which the first substrate 30 is to be mounted. Picking the first substrate 30 by a vacuum collet, and aligning the direction of the first substrate 30 with the frame 20 by touching the rear end 30b of the first substrate 30 to the front surface 23a of the bush 23, which is the reference surface for the assembly. The touch of all of the rear end 30b of the first substrate 30 to the reference surface 23a may secure the parallelism of the first substrate 30, namely, the PD array 29 against the frame 20. Then, as maintaining the parallelism between the PD array 29 and the frame 20, lifting up the collet, displacing the collet rearward by a preset distance from the reference surface 23a, pushing the first substrate 30 against the second substrate 31, and curing the resin between the first and second substrates, 30 and 31, the PD assembly may be bonded on the second substrate 31. Then, the conventional wire-bonding between the PD array 27 and the pre-amplifier IC 32, between the pre-amplifier IC 32 and the interconnections provided on the second substrate 31 and connected to the electrical components on the second substrate 31, and so on are carried out.

(6) Assembling Lens Array

Figure 9B:
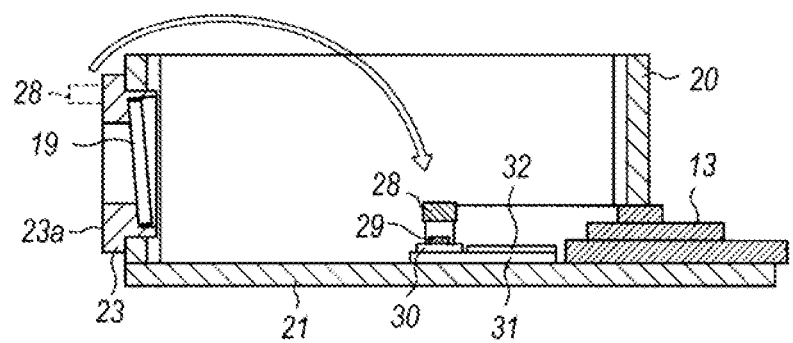
FIG. 9B shows a process to install the lens array on the PD assembly.

Next, the lens array 28 is placed on the post 33 of the PD assembly, as shown in FIG. 9B. Specifically, the device unit 12 is first set on the alignment stage, which is not shown in the figures. Then, similar procedures of the process (5) above described places the lens array 28 on the post 33. That is, picking the lens array 28 by the collet, touching the rear edge of the lens array 28 to the reference surface 23a, moving the collet as maintaining the parallelism between the lens array 28 and the reference surface 23a to a position above the PD array 29, pushing the lens array 28 against the post 33, and curing the resin applied on the top of the post 33 by irradiating with ultraviolet rays, the lens array 28 is mounted on the post 33. A feature of the process for the lens array 28 distinguishable from the process for the PD array 29 is that, after moving the lens array 28 above the PD array 29 before pushing the lens array 28, the process aligns the lateral position of the lens array 28 is adjusted by visual inspection. When the center of the lens array 28 is offset from the center of the PD array 29, the process adjusts the lateral position of the lens array 28 by moving the collet. After the alignment of the lens array 28 above the PD array 29, the lens array 28 is pushed against the PD array 29 by falling down the collet. The irradiation with the ultraviolet rays may cure the resin, and the thermo-curing may harden the resin. Thus, the lens array 28 is fixed above the PD array 29 as aligning lens elements 28a with respective PD elements 29a. A feature of the process to assemble the lens array 28 with the PD array 29 is that the alignment of respective elements, 28a and 29a, may be carried out only by the visual inspection.

(7) Assembling Support within Frame

Figure 9C:
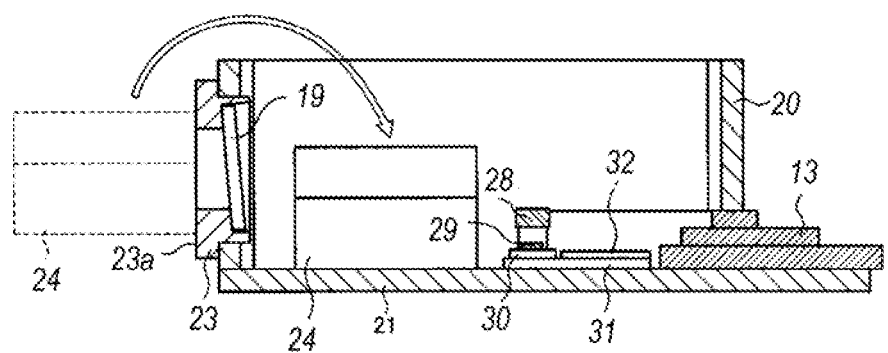
FIG. 9C shows a process to install the support within the housing.

Similar to the process for assembling the PD assembly and the lens array 28 into the device unit 12, the support 24 is first touched to the reference surface 23a of the bush 23 as roughly aligning a center of the support 24 with the center of the frame 23, as shown in FIG. 9C. Then, the collet carries the support 24 to a position within the frame 23 and places the support 24 on the bottom 21. The ultraviolet rays may cure the resin, and the thermo-curing may harden the resin to fix the support 24 on the bottom 21 rigidly. The support 24 has a U-shaped cross section opened upward, and the support 24 is unnecessary to be precisely aligned in the center thereof with the center of the frame 23.

(8) Assembling Intermediate Product within Device Unit

Figure 10:
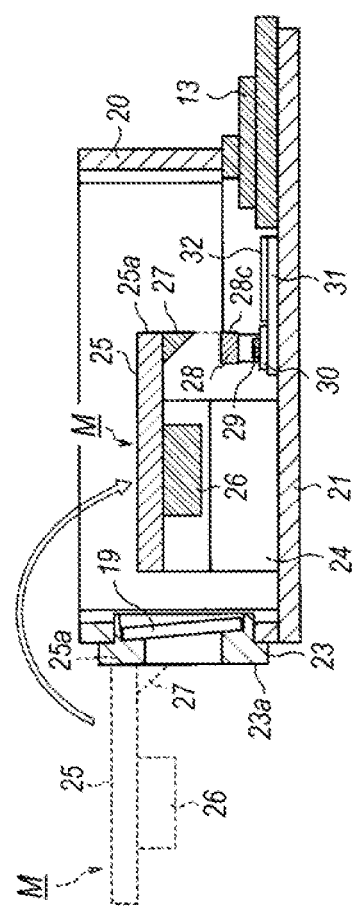
FIG. 10 shows a process to assemble the intermediate product, which includes the optical de-multiplexer and the mirror on the carrier, into the housing.

In the process to assemble the intermediate product M, ultraviolet curable resin is first applied on the top of the support 14, then, the intermediate product M is picked up such that the surface thereof on which the O-DeMux 26 and the mirror 27 are mounted faces the bottom 21 of device unit 12. Subsequently, as shown in FIG. 10, the rear end 25a of the carrier 25 is abutted against the front surface 23a of the bush 23 to align the direction of the intermediate assembly M with the frame 20. As keeping the direction thereof, the intermediate assembly M is carried in a position above of support 24 and placed on the support 24 so as to align the rear end 25a of the carrier 25 with the rear end 28c of the lens array 28 only by the visual inspection.

Figure 11:
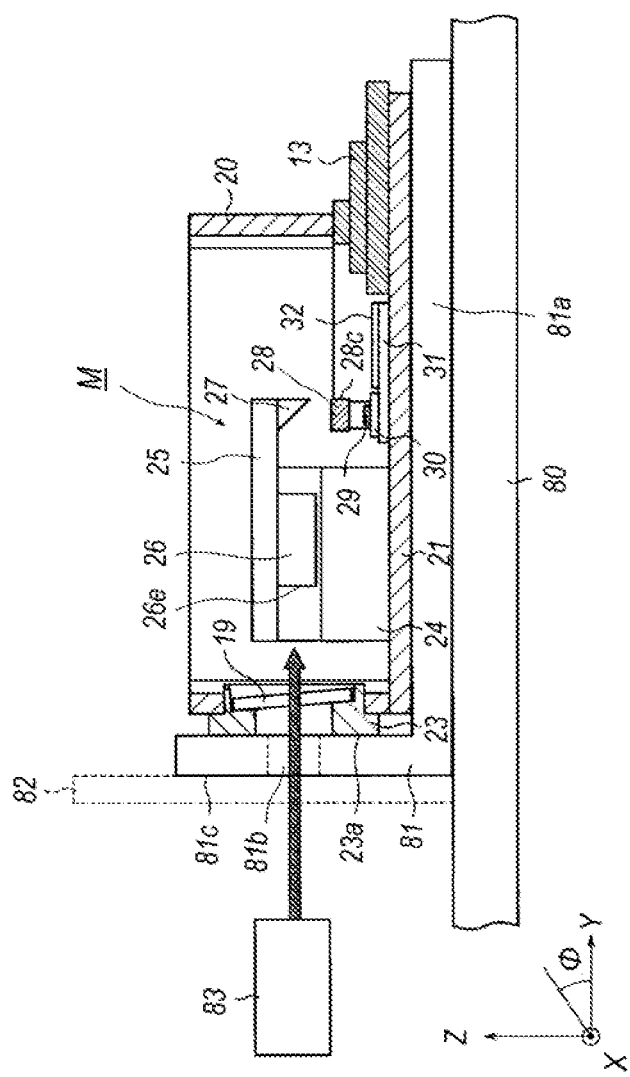
FIG. 11 shows a process to align the optical de-multiplexer with respective PD elements.

Then, the precise alignment between the O-DeMux 26 and the lens array 28 is carried out. As illustrated in FIG. 11, the device unit 12 that temporarily installs the intermediate assembly M on the support 24 is set on the alignment stage 80 as interposing an alignment tool 81 therebetween. The alignment tool 81, which is made of metal, typically, stainless steel, has an L-shaped cross section with the horizontal bar 81a mounting the device unit 12 as the vertical bar 81c abutting against the front surface 23a of the bush 23. Moreover, a mirror 82 is set in front of the vertical bar 81c of the L-character. The mirror 82 and the vertical bar 81c has openings in respective positions corresponding to the window 19.

The process of the present embodiment next prepares an external test beam 83, which is the collimated beam and includes wavelengths each corresponding to the optical signals multiplexed in the signal light which the optical receiver module 10 of the present embodiment receives. That is, the external test beam fully emulates the signal light subject to the present optical receiver module 10.

The external test beam 83 is first aligned so as to enter the mirror 82 in a right angle. That is, the external test beam 83 is reflected by the mirror 82 and detected at a position where the external test beam is output; then aligned such that the magnitude of the reflected test beam becomes a maximum. Next, the process translates the external test beam to a center of the window 19 as keeping the angle thereof with respect to the mirror 82 so as to input the external test beam into the O-DeMux 26 which is temporarily placed on the support 24. The O-DeMux 26 is finely aligned with the lens array 28 in perpendicular and parallel with respect to the external test beam such that photocurrents generated by respective PD elements 29a become maxima, or at least greater than a preset threshold. Finally, the carrier 25 is permanently fixed on the support 24 by curing the resin optically and thermally.

(9) Assembling Coupling Unit

Figure 12:
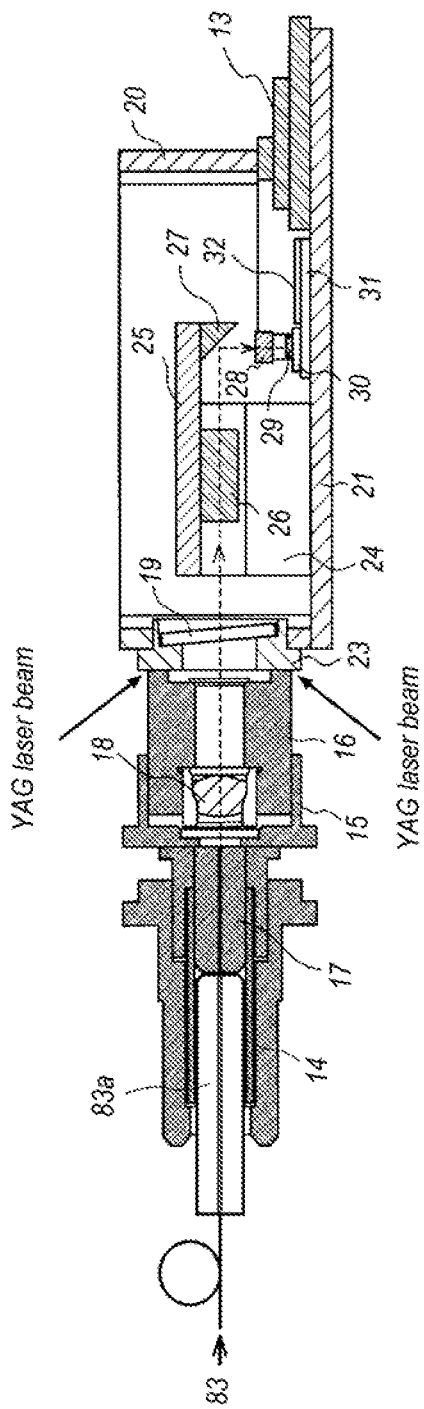
FIG. 12 shows a process to assemble the coupling unit with the device unit.
Figure 13A:
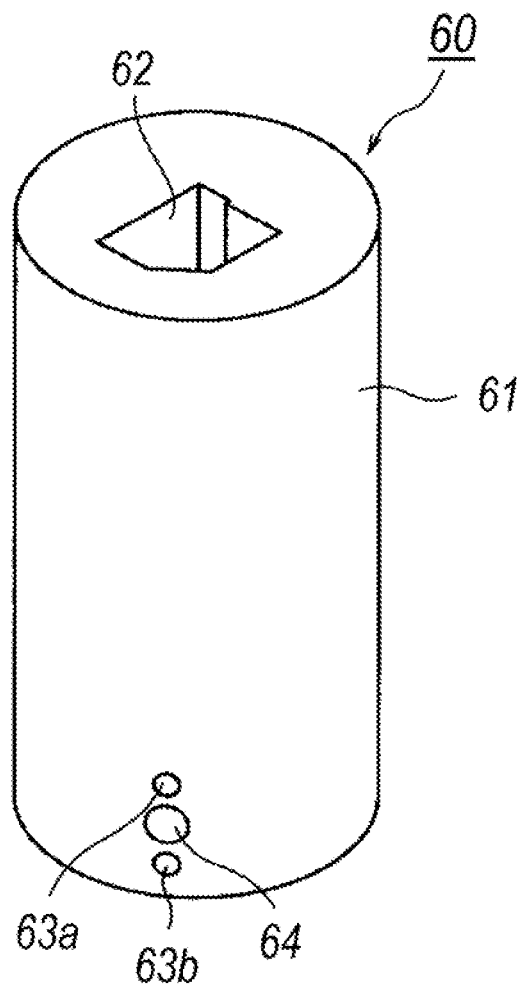
FIG. 13A shows a pillar used for polishing the front surface of the frame.
Figure 13B:
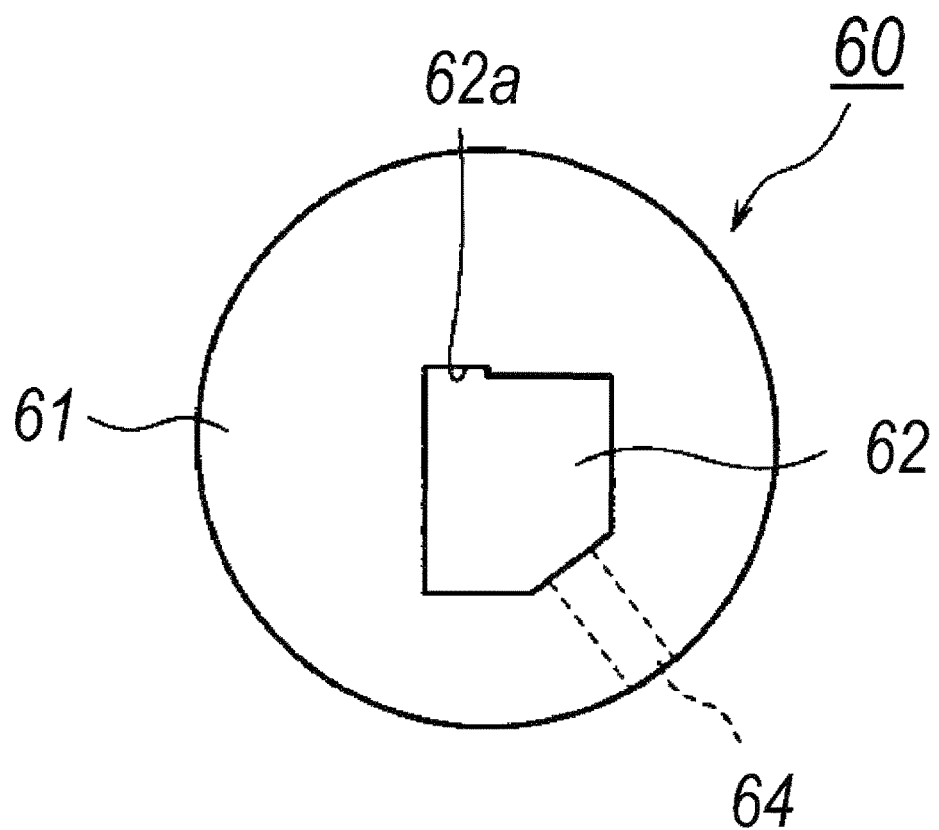
FIG. 13B is a plan view of the pillar showing the pocket within which the frame is set.
Figure 13C:
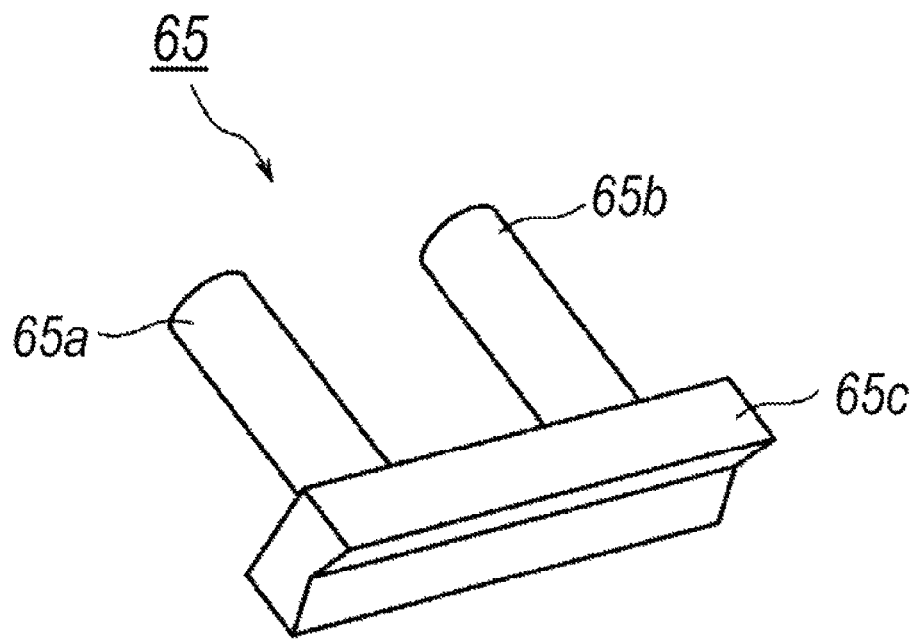
FIG. 13C shows a pusher to push the frame against the reference corner of the pocket.
Figure 13D:
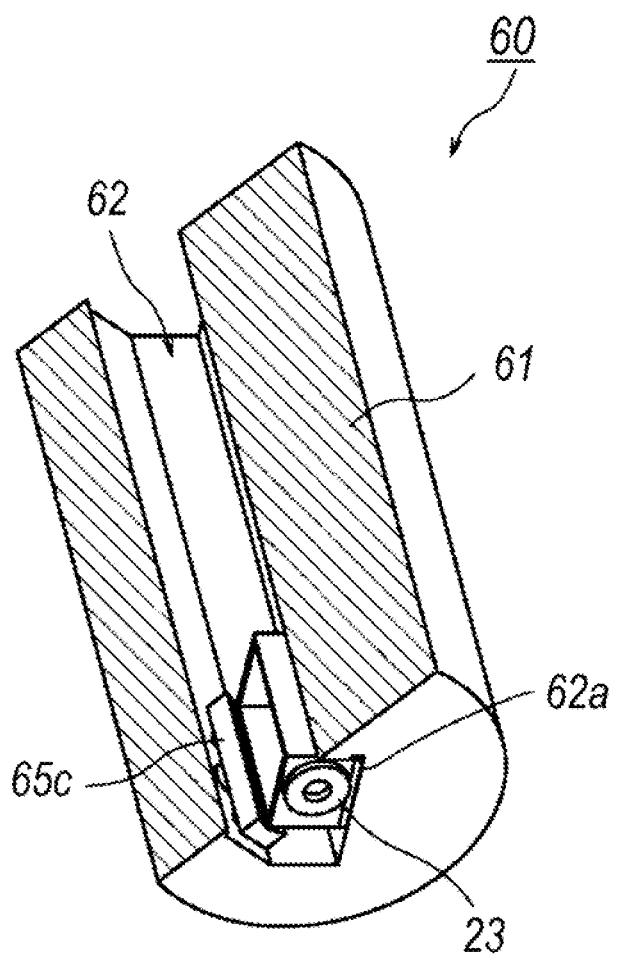
FIG. 13D shows the frame set in the pocket.
Figure 14A:
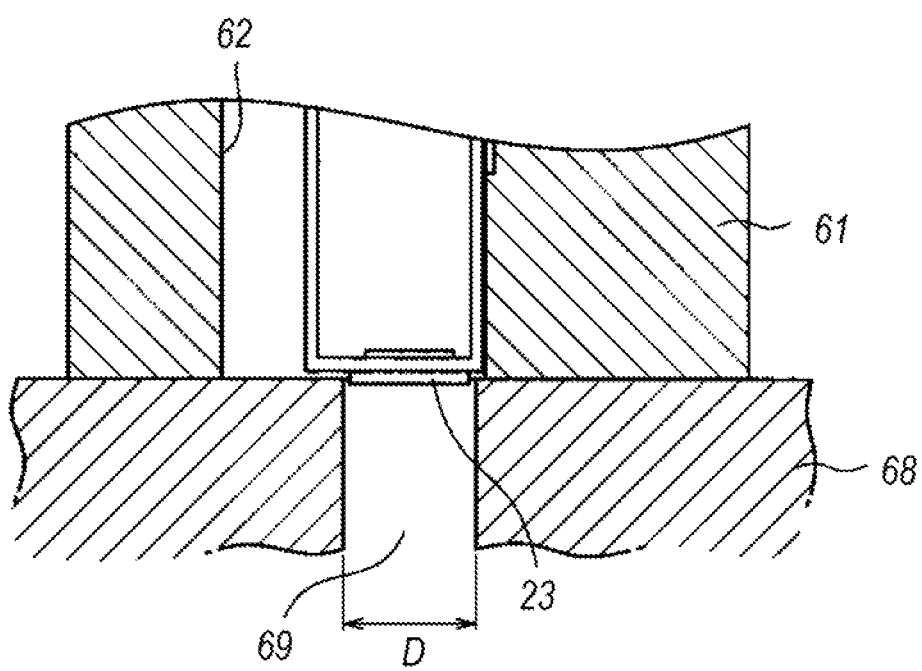
FIG. 14A explains how an amount of the front surface of the housing to be polished.
Figure 14B:
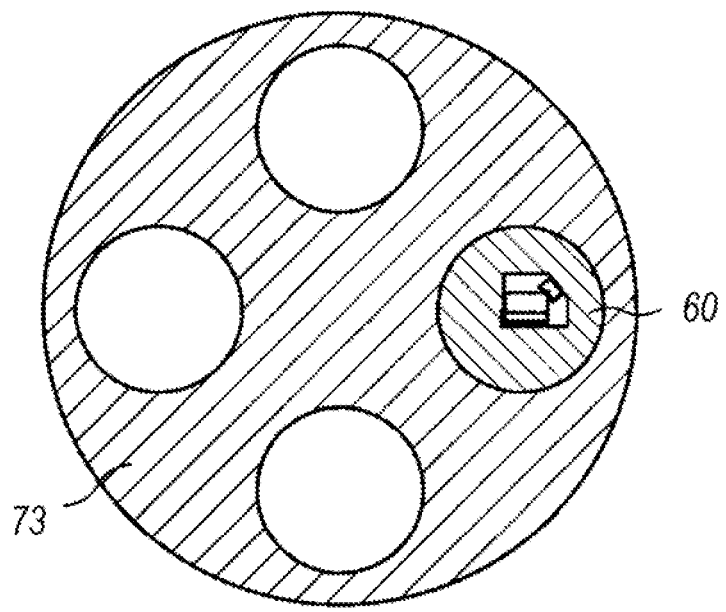
FIG. 14B shows the polishing stage.

The process finally assembles the coupling unit 11 with the device unit 12. As shown in FIG. 12, the external test beam 83 is coupled again with the device unit 12 but through the coupling unit 11. Specifically, the external test beam 83 enters the coupling unit 11 by plugging the ferrule 83a with the sleeve 14. The ferrule 83a in a tip thereof comes in physically contact with the tip of the stub 17, which realizes the physical contact against the tips. Sliding the coupling unit 11 on the front surface 23a of the bush 23 so as to find a position of the coupling unit 11 at which the PD elements 29a generates respective photocurrents greater than the threshold. The coupling unit 11 is then permanently fixed to the device unit 12 by welding the root of the lens holder 16 with the surface 23a of the bush 23 by the YAG laser beam. Finally, the joint sleeve 15 finely aligns the stub 17 with the collimating lens 18 along the optical axis and within the plane perpendicular to the optical axis. Thus, the coupling unit 11 is optically aligned with the device unit 12. After the optical alignment, the lid 22 encloses the optical and electrical components within the space surrounded by the frame 20 and the bottom 21.

In the process described above, the mirror 82 for aligning the external test beam 83 provides the opening to guide the external test beam within the device unit 12 therethrough. However, the mirror 82 may have no opening. Specifically, the external test beam 83 is first roughly aligned in a center of the opening of the window. Then, the mirror 82 is set in front of the vertical bar 81c of the L-character as the back surface of the mirror 82 is fully in contact with the vertical bar 81. Then the angle of the external test beam 83 is adjusted so as maximize the reflected magnitude, which is detected in a position where the external test beam 83 is output. Then, the mirror 82 is removed to guide the external test beam 83 into the device unit 12. Thus, a process to translate the external test beam 83 may be omitted.

As described above, the front wall of the housing, exactly, the front surface 23a of the bush 23 preferably makes an angle of 90±0.5° against the bottom 21 of the housing on which the O-DeMux 26 and the mirror 27 are mounted through the support 24 and the carrier 25. One solution to obtain such a front surface 23a having a precise relation against the bottom 21 is to polish the member. Next, a process to polish the front surface 23a of the bush 23 will be described as referring to FIGS. 11A to 12B. FIGS. 11A to 11D are a perspective view showing an example of a polishing tool 60, a lateral cross section of the polishing tool 60, a pusher 65 combined with the polishing tool 60, and a cross section showing the pusher 65 set within the polishing tool 60, respectively. FIG. 12A is a cross section to adjust an amount to be polished and FIG. 12B shows a polishing stage to which a polishing tool 60 with the pusher 65 is set therein.

The polishing tool 60 has a pillar 61 having a pocket 62 into which the frame 20 of the optical receiver module 10 is set. The pocket 62, as shown in FIG. 11B, has a rectangular shape with one chamfered corner. The corner opposite to the chamfered one becomes the reference corner. That is, abutting the bottom 21 and one side wall 12b of the frame 20 against two sides extending from the reference corner, an angle between the front surface 23a of the bush 23 and the bottom 21 may be defined. One of two sides provides a relief 62a from the reference corner to secure the preciseness of the right angle. Two sides extending from the reference corner may have this relief 62a.

The pusher 65 shown in FIG. 11C pushes the frame 20 set within the pocket 62 against two sides described above. The pusher 65, as illustrated in FIG. 11C, provides a block 65c to be in contact with the frame 20 and two guides, 65a and

65b, inserted into respective guide holes, 63a and 63b, provided in the pillar 61 from the inside of the pocket 62. The pillar 61 further provides a screw hole 64 between two guide holes, 63a and 63b, to push the pusher 65 inward by a screw set therein. Torque to rotate the screw may control the pressure caused by the pusher 65 against the frame 20. The block 65c, as illustrated in FIG. 11C, has a V-shaped cross section, where the bottom of the V-shape is to be in contact to a top edge of the side wall 12b of the frame 20. Thus, the block 65C uniformly pushes the frame 20 against two sides.

The polished amount of the front surface 23a may be controlled by an arrangement illustrated in FIG. 12A. That is, a stage 68, which provides an opening 69 whose diameter D is slightly greater than a diameter of the bush 23, is prepared. Setting the bush 23 within the opening 69 and protruding the bush 23 within the opening 69, the top surface 23a of the bush 23 protrudes from the bottom of the pillar 61. Fixing the frame 20 by the pusher 65 as adjusting the protrusion of the front surface 23a of the bush 23 from the pillar 61, the polished amount may be optionally defined.

The pillar 61, which sets the frame 20 within the pocket 62, is set on the polishing stage 73 that provides a plurality of holes into which the polishing tool 60 is set. The example of the polishing stage 73 shown in FIG. 12B provides four holes; but the polishing stage 73 may provide two or more holes where they are arrange on the polishing stage 73 so as to form a concentric circle. Rotating the polishing tool 60 around a center thereof within respective holes, and revolving the polishing stage 73, that is, the frame 20 set within the pocket 62 of the pillar 61 are doubly rotated and the polished surface 23a of the bush 23 becomes precisely flat as making the right angle against the bottom 21.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An optical receiver module, comprising:
a coupling unit that collimates a received wavelength multiplexed signal; and
a device unit including
an optical de-multiplexer that de-multiplexes the wavelength multiplexed signal received by the coupling unit into a plurality of optical signals each having a wavelength different from each other,
a plurality of photodiode (PD) elements each receiving the optical signal corresponding thereto, and
a housing that encloses the optical de-multiplexer and the PD elements therein,
wherein the housing provides a bottom and a side wall, the side wall having a window for passing the wavelength multiplexed signal coming from the coupling unit and fixing the coupling unit thereto, the optical de-multiplexer being set in parallel to the bottom of the housing,
wherein the side wall is polished in an angle of 90±0.5° with respect to the bottom of the housing.

2. The optical receiver module of claim 1, wherein the side wall provides a bush having the window, and wherein the bush in an outer surface thereof is polished in the right angle with respect to the bottom of the housing.

3. A process to assemble an optical receiver module that provides a coupling unit and a device unit, the coupling unit collimating a wavelength multiplexed signal entering therein, the device unit including an optical de-multiplexer, a mirror, a photodiode (PD) array, and a housing, the optical de-multiplexer generating a plurality of optical signals each having a specific wavelength different from others by de-multiplexing, the wavelength multiplexed signal provided from the coupling unit, the mirror reflecting the optical signals toward the PD array, the PD array integrating a plurality of PD elements for detecting respective optical signals reflected by the mirror, the housing enclosing the optical de-multiplexer, the mirror, and the PD array, the housing having a side wall and a bottom that makes an angle of 90±0.5° with respect to the side wall, the side wall fixing the coupling unit thereto, the bottom of the housing mounting the PD array thereon, the process comprising steps of:
mounting, the optical de-multiplexer and the mirror on a carrier such that the optical de-multiplexer makes a preset angle with respect to an edge of the carrier;
installing the carrier within the housing by steps of,
abutting the edge of the carrier against the side wall of the housing, and
translating the carrier within the housing; and
aligning the optical de-multiplexer with the PD array.

4. The process of claim 3, further comprising steps of,
before the step of aligning the optical de-multiplexer, polishing the side wall of the housing so as to make an angle of 90±0.5 against the bottom of the housing, and
after the step of aligning the optical de-multiplexer, fixing the coupling unit to the side wall of the housing by welding.

5. The process of claim 3, wherein the step of aligning the optical de-multiplexer includes steps of:
preparing a test beam that multiplexes a plurality of optical signals having wavelengths subject to the optical receiver module,
entering the test beam into the optical de-multiplexer from a direction perpendicular to the side wall of the housing, and
adjusting a position of the optical de-multiplexer in perpendicular and in parallel with respect the test beam such that the PD elements each generates a photocurrent greater than a preset threshold.

6. The process of claim 5, wherein the step of preparing the test beam includes steps of:
setting a mirror in parallel to the side wall, and
adjusting an angle of the test beams such that the test beam reflected by the mirror and
detected at a position where the test beam is output becomes a maximum.

7. The process of claim 6, wherein
the optical receiver module further comprises a lens array that integrates a plurality of lens elements corresponding to the respective PD elements,
wherein the process further includes, before the step of aligning the optical de multiplexer but after the step of mounting the PD array, steps of:
aligning the lens array with the housing by touching an edge of the lens array to the side wall,
moving the lens array within the housing,
aligning the lens array with the PD array on the bottom of the housing by visual inspection, and
mounting the lens array in front of the PD array.

8. The process of claim 6, wherein the step of preparing the test beam further includes a step of translating the test beam such that the test beam passes a center of a window provided in the side wall of the housing.

9. The process of claim 6, further comprising
a step of, before the step of aligning the optical de-multiplexer but after the step of mounting the PD array, bonding the PD elements electrically to respective interconnections provided in the housing.

10. The process of claim 5, wherein the step of preparing the test beam includes steps of:
setting the test beam such that the test beam passes a center portion of a window provided in the side wall of the housing,
setting a mirror in parallel to the side wall at in front of the side wall,
adjusting an angle of the test beams such that the test beam reflected by the mirror and detected at a position where the test beam is output becomes a maximum, and
removing the mirror.

11. The process of claim 3, wherein
the step of mounting the optical de-multiplexer and the mirror includes a step of mounting the mirror on the carrier such that the mirror in an edge thereof becomes in parallel to the edge of the carrier.

\* \* \* \* \*

UNITED STATES PATENT AND TRADEMARK OFFICE
CERTIFICATE OF CORRECTION

PATENT NO. : 10,281,653 B2
APPLICATION NO. : 14/909710
DATED : May 7, 2019
INVENTOR(S) : Masanobu Kawamura et al.

Page 1 of 1

It is certified that error appears in the above-identified patent and that said Letters Patent is hereby corrected as shown below:

In the Claims

In Column 12, Lines 34 thru Line 45, cancel the text beginning with "5. The process" to and ending with "a preset threshold" and insert the following claim:
--5. The process of claim 3, wherein the step of aligning the optical de-multiplexer includes steps of:
  preparing a test beam that multiplexes a plurality of optical signals having wavelengths subject to the optical receiver module,
  entering the test beam into the optical de-multiplexer from a direction perpendicular to the side wall of the housing, and
  adjusting a position of the optical de-multiplexer in perpendicular and in parallel with respect to the test beam such that the PD elements each generates a photocurrent greater than a preset threshold.--

Signed and Sealed this
Twenty-eighth Day of April, 2020

Andrei Iancu
*Director of the United States Patent and Trademark Office*